United States Patent [19]

Janssen

[11] 4,005,645
[45] Feb. 1, 1977

[54] COOKING UTENSIL ACCESSORIES

[76] Inventor: Alexander Patton Janssen, 28 Old Farm Road, Bellair, Charlottesville, Va. 22903

[22] Filed: Dec. 5, 1975

[21] Appl. No.: 637,966

Related U.S. Application Data

[63] Continuation-in-part of Ser. No. 327,658, Jan. 29, 1973, Pat. No. 3,946,654.

[52] U.S. Cl. .................................................. 99/403
[51] Int. Cl.² ......................................... A47J 27/10
[58] Field of Search ............ 99/330, 332, 336, 345, 99/355, 359, 403–449, 295, 323, 349, 450; 126/373, 39 M; 229/1.5 H, 3.5 MF; 220/65

[56] References Cited

UNITED STATES PATENTS

| 1,428,388 | 9/1922 | Miller | 99/403 |
|---|---|---|---|
| 1,566,874 | 12/1925 | Jackson | 99/403 |
| 1,608,901 | 11/1926 | Miller | 220/65 |
| 2,395,794 | 2/1946 | Foster | 126/373 |
| 2,939,606 | 6/1960 | Durbin | 126/39 M X |
| 3,307,955 | 3/1967 | Pritle | 99/449 X |
| 3,779,231 | 12/1973 | Anderson | 126/373 |
| 3,782,976 | 1/1974 | Maier et al. | 229/3.5 MF X |

Primary Examiner—Leonard D. Christian
Assistant Examiner—Arthur O. Henderson
Attorney, Agent, or Firm—Strauch, Nolan, Neale, Nies & Kurz

[57] ABSTRACT

Accessories for making conventional cooking utensils usable with disposable bags and liners to produce cooked comestibles of superior quality and to eliminate the cleaning appurtenant to conventional cooking techniques.

37 Claims, 17 Drawing Figures

COOKING UTENSIL ACCESSORIES

This application is a continuation-in-part of application Ser. No. 327,658 filed Jan. 29, 1973 now U.S. Pat. No. 3,946,654.

The present invention relates to cooking utensils and, more specifically, to accessories by which conventional cooking utensils can be given the capability of cooking by the techniques described in parent application no. 327,658.

Cooking utensils equipped with the novel accessories disclosed herein are intended to be used in many, if not most, instances with a disposable bag or liner in which the comestibles are contained during the cooking process (the term "bag" as employed herein is intended to have a broad meaning and to include sheets of material gathered into a baglike form, etc. as well as those formed containers more conventionally thought of as bags). The bag or liner is surrounded by a cooking medium for transferring heat to its contents during the cooking cycle. The cooking medium will typically be water or an oil in the case of stovetop cookery and air for oven cookery.

Cooking in bags or disposable liners of the character just described has a number of important advantages. First, this permits comestibles to be cooked in their own juices. The natural taste of the food is preserved and the loss of nutritional values which occurs when foods are cooked in water is avoided along with the mushy or waterlogged texture which commonly results.

Another virtue is that the utensil is not soiled during the cooking process. Thus, the inconvenience of cleaning the utensil after it is used is eliminated; only rinsing and drying are required.

Furthermore, the bag or liner in which the comestibles are cooked is utilizable to store them. This is a particular convenience if the bag or liner is stored in a refrigerator container or the like as the latter will not become soiled.

The novel devices by which conventional cooking utensils are made capable of cooking comestibles by the techniques just described keep the bag or liner and the comestibles contained in it submersed in the cooking medium when comestibles which would otherwise float are being cooked. This results in heat being conducted uniformly to the comestibles from all directions and, typically, at a higher temperature than it would be if the bag and its contents were allowed to float in the cooking medium. As a consequence, the comestibles are cooked more quickly and more uniformly.

The bag holding attachment can be constructed so that it, the bag, and the comestibles will be kept in place by the weight of the attachment. Alternatively, provision may be made for positively or mechanically securing the device to the container with which it is employed to achieve this goal.

The novel accessories disclosed herein are designed to secure the upper, open end of the bag in a manner that will allow gases and vapors evolved from the comestibles to escape while keeping the cooking medium fron entering the bag. This permits the bag to collapse against its contents, considerably increasing the efficiency with which heat is transferred to the comestibles; it also maximizes the uniformity with which heat is transferred to the comestibles from different directions. Furthermore, by permitting gases and vapors to escape, the tendency of the bag to float is minimized as is the possibility of the bag rupturing due to a build-up of internal pressure.

Attachments featuring a holddown action can also be employed to advantage in conventional, bagless cooking to keep the comestibles submersed in the cooking medium. In this style of cookery, also, evenness and guickness of cooking is promoted by the use of such a device.

The novel attachments described herein include a series of inwardly extending elements pivotably fixed to an associated base at their outer ends. These elements are concomitantly rotatable between a closed position in which a disposable bag attached to their inner ends as by one of the novel spring clip constuctions disclosed herein can collapse around its contents and an open position in which the inner ends of the elements are rotated upwardly and outwardly to spread the open end of the bag and furnish access to its contents.

In those applications where a bag is not employed, the pivotable elements overlap and co-operate to keep the comestibles submersed in the closed position. In the open position they are spread apart to furnish access to the comestibles.

A novel feature which can be employed in the attachments just described is a toggle mechanism which locks the pivotable elements in the open position and limits the downward movement of the pivotable elements as they are pivoted toward the closed position. This permits the disposable bag or liner to collapse closely around the comestibles in applications employing the same, promoting uniform and efficient cooking.

My novel cooking utensil attachments may also be provided with components for locating the attachment in a specific location relative to the vessel with which it is associated. Such components may take the form of legs, threaded positioning members, or spring arms or clips fixed to the attachment base; a flange around its upper end; or combinations of the foregoing.

In those supporting arrangements employing a flange the lid or cover may be made part of the attachment as it can be configured to fit the flange rather than the vessel with which the attachment is associated. The flange itself completes the isolation of the vessel from the surrounding environment.

I have also discovered that it is not necessary to furnish all of the pivotable elements with components to which the disposable bag can be attached. They can instead be used with only selected ones of the elements and the latter interconnected by more simply configured elements to provide the wanted concomitant movement of the elements. An appreciable savings in cost can result from this construction. Also, it permits a simplified latch for keeping the pivotable elements in their closed positions to be employed.

Another feature possessed by the preferred embodiments of the present invention is an arrangement for detachably securing the lower corners of the bag to the attachment or accessory. This produces two important advantages.

First, this keeps the bag from being buoyed upwardly in a liquid cooking medium and, also, permits the cooking medium to more effectively collapse the bag against the comestibles. The result is that the bag is more uniformly surrounded by the cooking medium, producing more efficient and uniform cooking of the comestibles.

Second, by securing the lower end of the bag to the attachment, corners are eliminated and a rounded, more open shape is given to the lower end of the bag.

This significantly facilitates the removal of comestibles from the bag.

To take maximum advantage of the feature just discussed, I preferably employ a novel bag construction which facilitates the attaching of the bag to the accessory. At the same time these bags can be economically manufactured so that the added convenience can be economically obtained.

The use of a special bag construction is, however, not essential. I have also developed a novel spring retainer arrangement which can be employed to retain the corners of conventional bags in place.

Disposable bags for cooking and containers with disposable liners are as such not new as shown by U.S. Pat. Nos. 3,027,261 issued Mar. 27, 1962, to Samara; 3,052,371 issued Sept. 4, 1962, to Van Bemmelen; 3,088,255 issued May 7, 1963, to Griem; 3,117,875 issued Jan. 14, 1964, to Burns; 3,227,305 Enssle; issued Jan. 4, 1966, to Ennsle; and 3,590,888 issued July 6, 1971, to Coleman; British Patent Specification No. 965,498 published July 29, 1964; and the Drackett Products Co. pamphlet entitled "How To Use Cooking Magic Bags" copyrighted in 1971. However, none of the foregoing are relevant to the present invention as none discloses an attachment by which a conventional cooking vessel can be converted to one with the capabilities described above.

From the foregoing, it will be apparent to the reader that important objects of the present invention reside in the provision of novel, improved attachments for making conventional cooking utensils usable in conjunction with disposable bags and liners to cook comestibles:

1. in a manner which will preserve the nutritional values of the comestibles;
2. in a manner which will keep them from acquiring a mushy or waterlogged texture;
3. in a manner which will preserve their flavor;
4. in a manner which will result in heat being transferred more evenly and efficiently from the cooking medium to the bag and the comestibles being cooked therein, producing more uniformly cooked comestibles faster and at lower cost;
5. in a manner which makes the comestibles readily removable even though the bag remains attached to the accessory;
6. conveniently and without the soiling of cooking vessels;
7. in a manner which makes them convenient to store without soiling a storage container;
8. in a manner providing various combinations of the foregoing advantages.

Another important object of the present invention resides in the provision of cooking utensils with various ones of the mechanical features described briefly above and with various combinations of these features.

Still another important object of the invention resides in the provision of novel, improved, relatively economical cooking bags which are particularly adapted for use with cooking utensil accessories of the character described above to promote efficient and uniform cooking and to facilitate removal of the comestibles.

Other important objects and advantages and further novel features of the present invention will become apparent from the appended claims and as the ensuing detailed description and discussion proceeds in conjunction with the accompanying drawing, in which:

Figure 1:
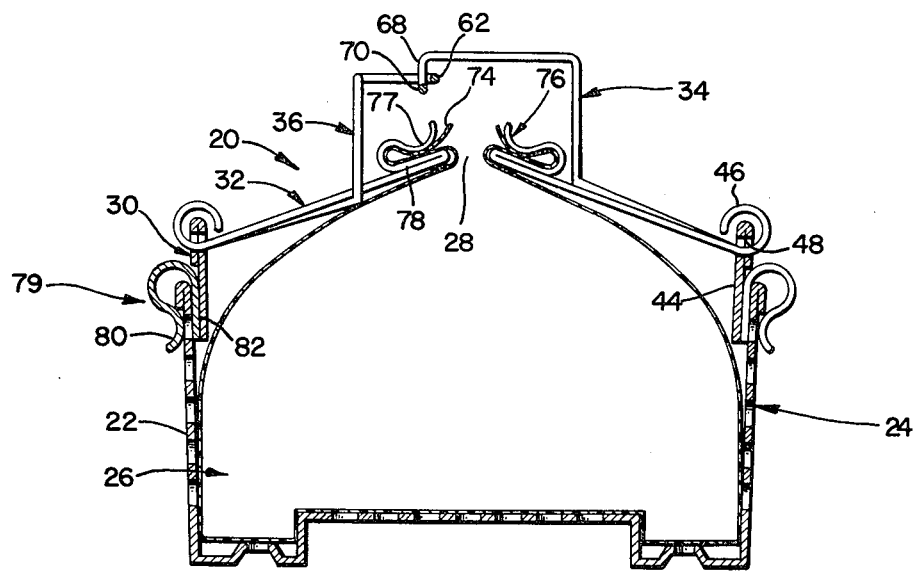
FIG. 1 is a vertical section through a cooking utensil accessory embodying and constructed in accord with the principles of the present invention.
Figure 2:
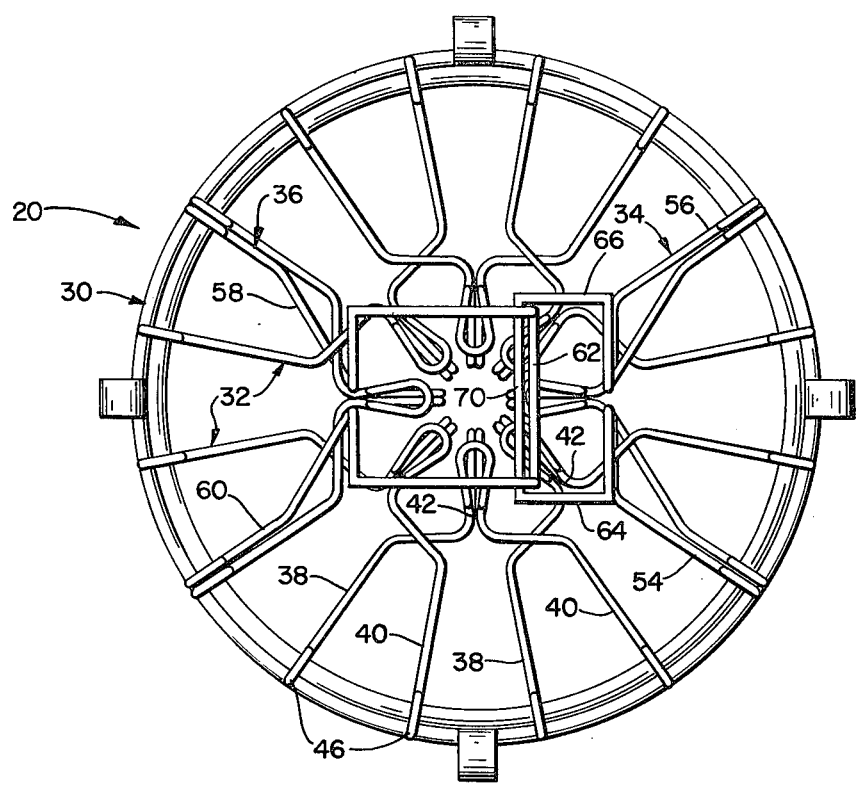
FIG. 2 is a plan view of the accessory of FIG. 1.

Referring now to the drawing, FIGS. 1 and 2 depict an attachment or holddown device 20 in accord with the principles of the present invention for giving conventional cooking vessels the capabilities described above.

FIG. 1 shows the holddown device 20 attached to the side walls 22 of a perforate rack 24 to keep a disposable bag 26 submersed and to selectively constrict and enlarge an opening 28 at the upper end of the bag for the purposes described previously. Rack 24 is intended to be used with a conventional pan in a manner akin to the racks shown in parent application No. 327,658. The perforations in the rack allow the cooking medium in the pan to circulate into direct contact with the sides and bottom of the bag. This promotes both even and rapid cooking.

It is by no means essential that the attachment be employed with a perforated rack. It may equally well be attached to the inner pan of a double boiler, to an imperforate rack, to a conventional pan; etc.

Referring now to both FIGS. 1 and 2, attachment 20 includes a rimlike member or base 30; inwardly extending, bag-supporting elements 32; and diametrically opposed latch elements 34 and 36.

As best shown in FIG. 2, each of the bag-supporting elements 32 has a V-shaped left-hand leg 38 and a similarly shaped right-hand leg 40 connected by a necked down, U-shaped portion 42 at the inner end of the element.

Bag-supporting elements 32 are pivotally fixed to the side wall 44 of base 30 at the upper edge thereof. Here, the wall is doubled back on itself for increased strength.

The pivotal connections to the base are provided by circular end portions 46 of legs 38 and 40. These extend through apertures 48 in the side wall 44 of base 30.

As shown in FIG. 2, the left-hand leg 38 of each element 32 lies below the right-hand leg 40 of the adjacent bag-supporting element. Thus, each element 32 supports and is supported by the adjacent element. As a consequence, all of the elements 32 move in unison as one of them is rotated either upwardly and outwardly to open bag 26 or downwardly and inwardly to close the bag.

This movement is effected by the diametrically opposed latch elements 34 and 36. These elements are pivotally connected to base 30 in the same manner as elements 32.

The left-hand leg 54 of element 34 lies under the right-hand leg 40 of the element 32 to its left while its right-hand leg 56 is supported by the leg 38 of the element 32 to its right. Similarly, the left-hand leg 58 of element 36 lies under the right-hand leg 40 of the element 32 to its left while its right-hend leg 60 is engaged from below by the left-hand leg 38 of the element 32 to its right. Accordingly, elements 34 and 36 and the several elements 32 all rotate in unison.

At the inner ends of legs 58 and 60, element 36 extends first outwardly and then toward element 34, terminating in a latch portion 62 oriented at a right angle to the latter. Similarly, at the inner ends of legs 54 and 56, element 34 extends laterally and then toward element 36, providing two, parallel, spaced apart leg portions 64 and 66 terminating in downwardly extending latch portions 68 (one of which is shown in FIG. 1) connected by a transversely extending portion 70. With elements 32, 34, and 36 rotated downwardly to keep bag 26 and its contents from floating in the cooking medium, the latch portions 68 of element 34 engage the cooperating latch portion 62 of element 36 to lock the elements in place.

Element 34 also constitutes a handle or grip by which it and elements 32 and 36 can be rotated between the positions shown in FIG. 2 in which the several elements are generally horizontal and overlap to keep comestibles submerged or a disposable, comestibles-filled bag collapsed around its submerged contents and positions in which the elements are generally vertically oriented and spread apart, providing access to the comestibles or the interior of the disposable bag.

A second and also important function of elements 34 and 36 is to co-operate with elements 32 to narrow the opening of bag 26 during cooking and spread the bag for access to its contents. With the upper end portion 74 of the bag gathered to narrow opening 28 as shown in FIG. 1, the cooking medium and condensates are kept from entering the bag and mingling with its contents. At the same time, a small opening remains; this permits vapors and gases evolved during the cooking process to escape from the bag. Both this and the keeping of unwanted fluids from the interior of the bag contribute to the production of cooked comestibles of superior guality.

To fix bag 26 to attachment 20 in a manner which will result in the bag opening and closing as elements 32 and 36 are manipulated, the inner, distal ends of the elements are deformed into a double-S-shaped configuration to provide spring clips 76. The upper portion 74 of bag 26 can be inserted at intervals around its periphery into the spring clips to secure the bag to the inner ends of the bag-supporting elements 32 by virtue of spring clip legs 77 clamping the bag against spring clip legs 78.

With the bag secured to spring clips 76, its upper portion 74 is gathered to narrow opening 28 when operator element 34 is rotated downwardly and inwardly because of the concomitant and like movement of elements 32 and 36. Conversely, when this operator is rotated upwardly and outwardly, elements 32 spread the bag to enlarge opening 28 and provide access to its interior.

In addition to those described above, attachment 20 numbers among its major components vertically oriented spring clips 79 attached to the base or rim 30 of the device. As shown in FIG. 1, the legs 80 and 82 of the spring clips engage opposite sides of the cooking utensil component with which they are employed to retain the attachment in place.

Figure 3:
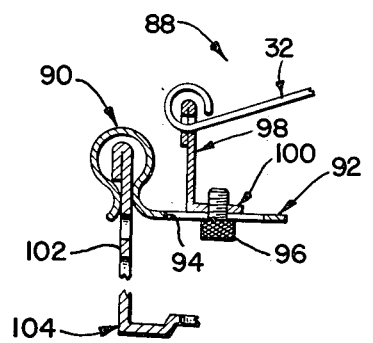
FIG. 3 is a fragment of a view similar to FIG. 1 showing another form of holddown attachment in accord with the principles of the present invention which can be adjusted to fit vessels of different sizes; it is shown fitted to a vessel larger in diameter than the disposable bag or liner holding structure of the accessory.
Figure 4:
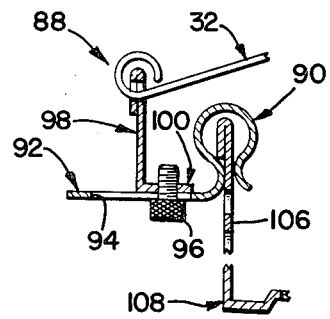
FIG. 4 is a view similar to FIG. 3 of the accessory shown in the latter Figure with the accessory in this case fitted to a cooking vessel smaller in diameter than the bag and liner holding structure.

Referring again to the drawing, FIGS. 3 and 4 depict an attachment 88 similar to that shown in FIGS. 1 and 2, but modified so that a single attachment can be employed with cooking vessels of different sizes. To the extent that the components of attachments 20 and 88 are alike, they have been identified by the same reference characters; and attachment 88 has been shown in only fragmentary form.

The spring clips 90 of device 88 differ from those described previously in that they are integrally formed at one end of a retainer member 92 having an elongated slot 94. A retainer 96 extends through slot 94 and is threaded into a horizontal flange 98 at the lower edge of base 100. The base or support may otherwise be identical to the corresponding component in the attachment identified by reference character 20 in FIG. 1.

The arrangement just described permits spring clips 90 to be adjusted outwardly and inwardly relative to base 100 so that the attachment can be attached to cooking vessels of different sizes. FIG. 3 shows retainer members 92 adjusted outwardly of support 100 to support the device from the side walls 102 of a rack 104 larger than the base 100 of the device. Conversely, FIG. 4 shows the same attachment with retainer members 92 readjusted and extending inwardly to support the attachment from the side wall 106 of a vessel 108 which is smaller in diameter than base 100.

Figure 5:
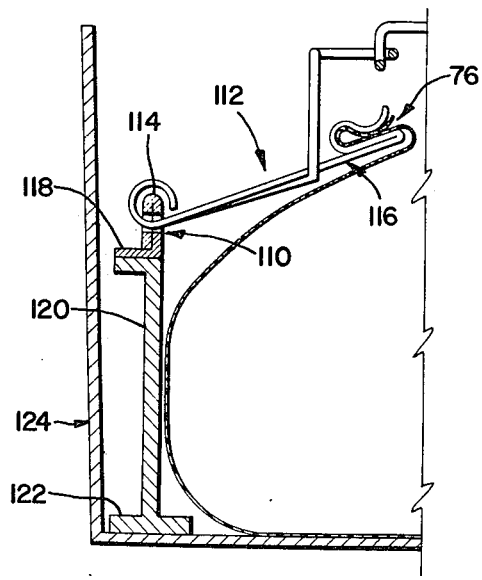
FIG. 5 is a vertical half-section through a third form of accessory in accord with the principles of the present invention.

Referring again to the drawing, FIG. 5 depicts yet another attachment intended to be primarily employed in conjunction with conventional cooking vessels for the purposes described previously. Like reference characters identify like parts; and the holddown device will be described only to the extent that it differs from those described previously.

Referring now to the drawing, the base or support 110 of attachment 112 includes a vertical flange 114 to which the pivotal, bag-supporting elements 116 and the latch elements of the device are attached and an outwardly extending, horizontal flange 118. Legs 120 are attached to flange 118 at intervals around base 110. These legs terminate in feet 122 and support the attachment in the cooking vessel with which it is employed. This may be, for example, a conventional pan such as that shown in FIG. 5 and identified by reference character 124.

This attachment can also be used with cooking vessels which differ in size to some extent. Like those described previously, it can be employed in stovetop, oven, and other cookery. For example, it could be used with a crock pot to keep the interior of the latter from being soiled.

Figure 8:
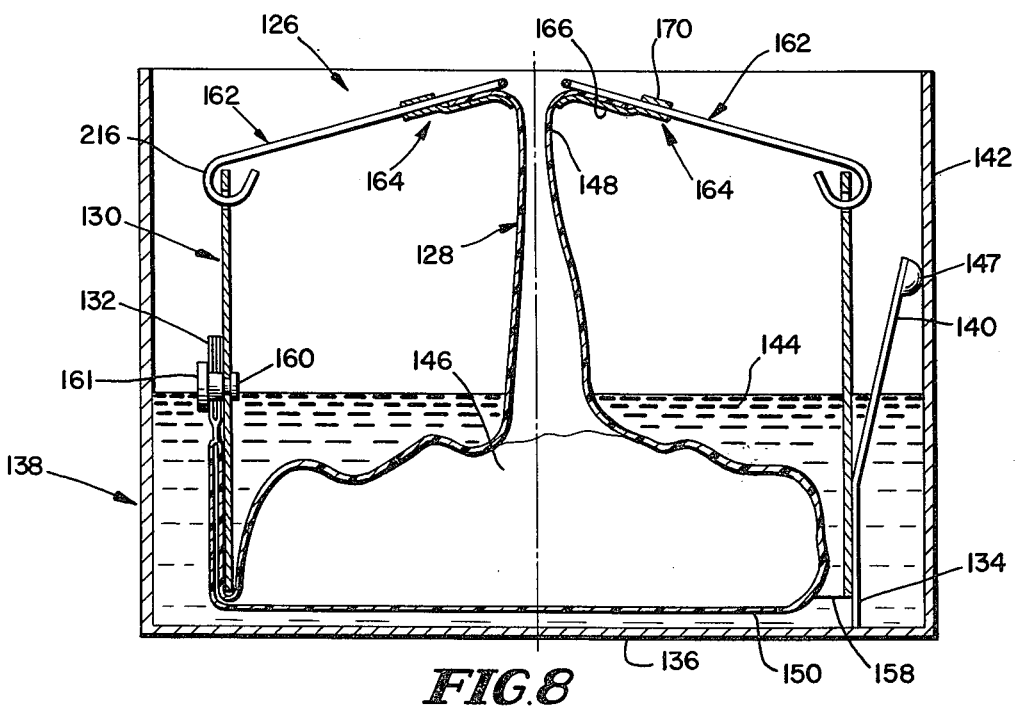
FIG. 8 is a section through the attachment and a pan with which it is associated, taken substantially along line 8—8 of FIG. 7.
Figure 7:
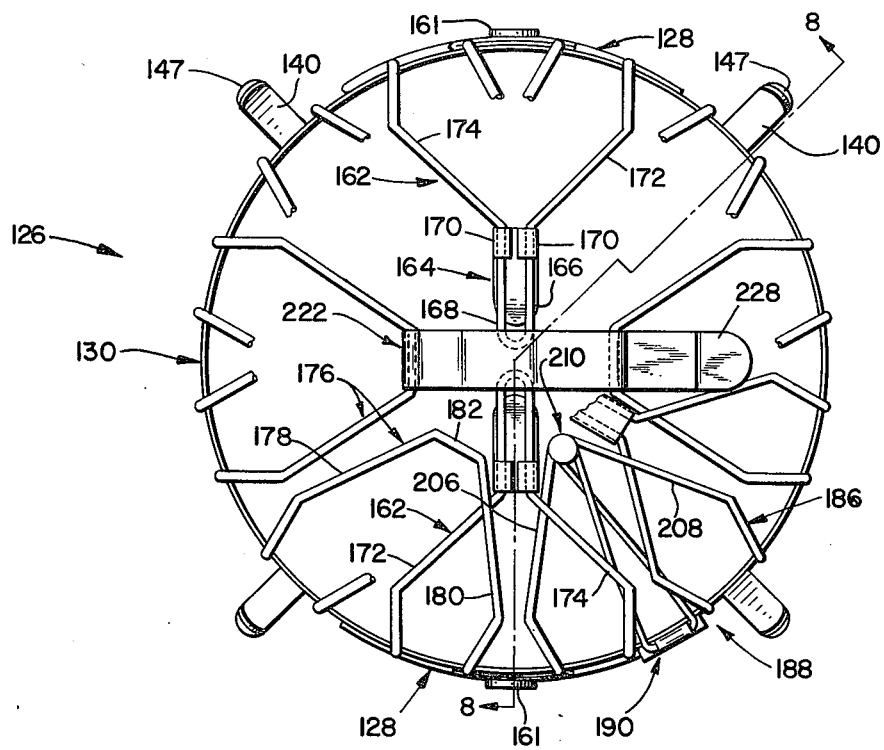
FIG. 7 is a plan view of the attachment of FIG. 6.
Figure 6:
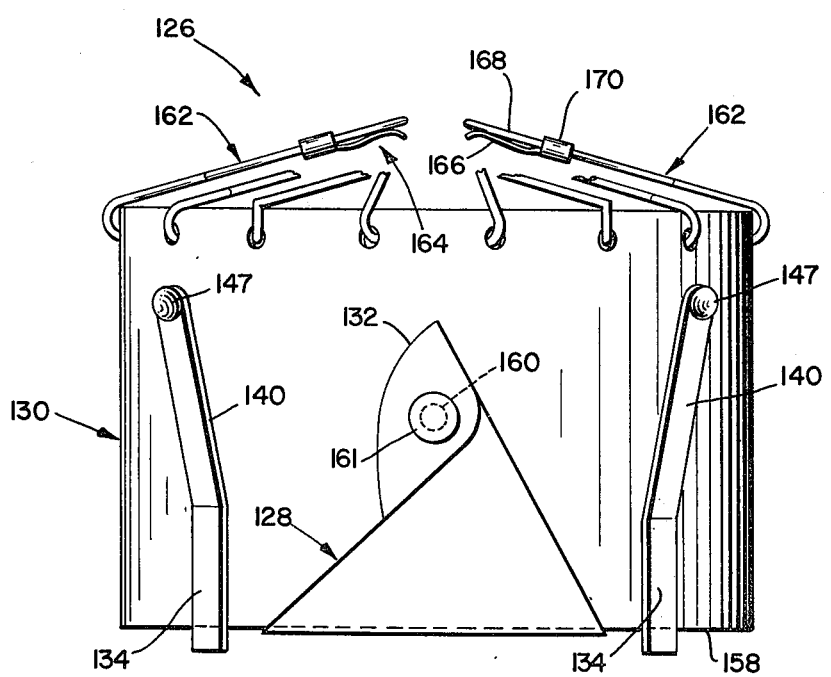
FIG. 6 is an elevation of a fourth embodiment of my invention.

Referring again to the drawing, FIGS. 6–8 depict a cooking utensil attachment 126 which differs from those described previously in that provision is made for stretching the lower end of the disposable cooking bag 128 across the lower end of the attachment base 130 and then securing the lower corners 132 of the bag to base 130 to keep it taut. As discussed previously, this eliminates the corners, facilitating the removal of comestibles from bag 128. Also, the lower end of the bag and its contents are kept from floating upwardly, promoting rapid and uniform cooking of the comestibles.

The base 130 of attachment 126 can be made from sheet metal, for example. Legs 134 fixed to the base as by riveting support the base from the bottom wall 136 of the pan 138 with which attachment 126 is employed. Spring arms 140, integral with legs 134, engage the vessel side walls 142 and center attachments 126 in the vessel. By virtue of this and the supporting of the base in the spaced relation to bottom wall 135 of the pan, free circulation of the cooking medium 144 to promote uniform cooking of the comestibles 146 in bag 128 is provided.

It is preferred that buffers 147 of a softer material be fixed to the upper, distal ends of spring arms 140 to keep the spring arms from marring the pan. This particularly important if the pan is lined with a Teflon or other easily damaged material.

Figure 13:
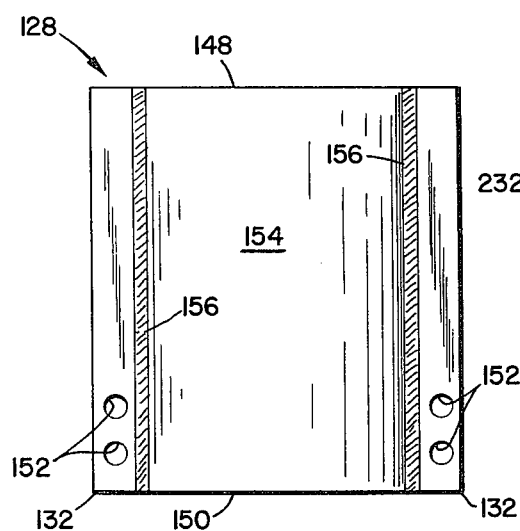
FIG. 13 is an elevation of a disposable bag particularly designed for use with accessories of the character shown in FIGS. 6–8.

As shown in FIG. 13, bag 128 has a rectangular configuration with an open upper end 148 and a closed lower end 150. Holes or apertures 152 are formed through the bag adjacent its lower end and adjacent the two edges of the bag. Inwardly of these apertures, the two sides 154 of the bag (only one of which is shown) are sealed together by seams 156 to prevent leakage through the apertures.

Bag 128 is secured to the base 130 of attachment 126 by stretching its closed end across the lower edge 158 of the base and then hooking the lower corners 132 of the bag over outwardly projecting studs 160 fixed to base 130, the studs extending through the holes 152 in the bag. Two diametrically opposed studs 160 are employed, one for each of the two corners 132 of the bag.

Studs 160 preferably have enlarged heads 161 over which the bag is stretched. The bag then relaxes to its original configuration so that the enlarged heads of the studs keep the corners of the bag in place.

Attachment 126 also differs from those described previously in that the upper end 148 of the disposable cooking bag is attached to the inner ends of the bag-supporting elements 162 by clips 164 which are separate components of the utensil rather than by integral spring clips as described above.

As best shown in FIGS. 7 and 8, spring clips 164 are of sheet metal construction. The clips have a spring portion 166 held against the necked down, distal end portions 168 of the pivotable elements 162 with which they are associated by retainer portions 170 at the outer ends of the clips. The retainer portions are bent around the legs 172 and 174 of the pivotable elements to secure the clips in place.

The upper edge of the disposable bag 128 is slipped between the spring portions 166 of the clips and the necked down portions 168 of the pivotable elements, permitting spring portions 166 to clamp the bag against the distal ends of the pivotable elements. As best shown in FIG. 8, the ends of the spring portions 166 into which the bag edge is inserted are preferably curved outwardly to facilitate insertion of the bag.

It is not necessary in the attachments described herein that there be bag engageable elements at the inner ends of all of the concomitantly pivotal members. In attachment 126, for example, the pivotal members 162 bearing bag engaging spring clips 164 are alternated with pivotal elements 176 having truncated legs 178 and 180 connected by an integral, lateral leg 182. The pivotal elements 162 and 176 are assembled in the same manner as those of the embodiments of the invention described previously; i.e., with the left-hand leg of each element 162 or 176 lying under the right-hand leg of the element to its left and the right-hand leg overlying the left-hand leg of the element to its right.

The arrangement just described has the advantage of reducing the number of bag engaging elements and, therefore, the cost of the attachment.

In one actual embodiment of my invention intended for use with a three-quart saucepan, there are six elements of the character identified by reference character 162 in FIG. 7. There are five pivotable elements of the character identified by reference character 176. The place of the sixth element of the latter type is taken by the pivotable member 186 of a retainer or toggle mechanism 188.

Figure 9:
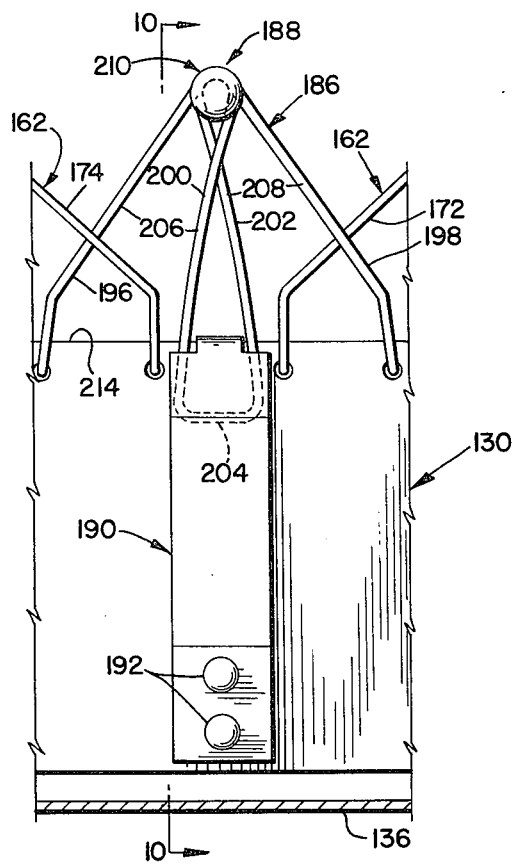
FIG. 9 is a partial elevation of the attachment of FIGS. 6–8, showing a toggle member employed in the attachment in one of its two operative positions.
Figures 10, 11:
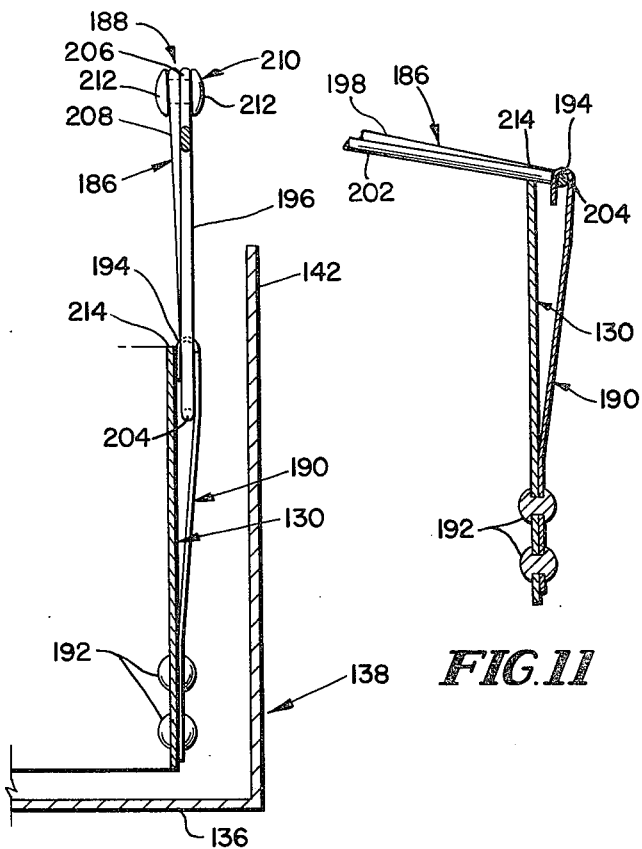
FIG. 10 is a section through the attachment of FIGS. 6–8, taken substantially along line 10—10 of FIG. 9.
FIG. 11 is a fragmentary vertical section showing the toggle mechanism in the second of its two operative positions.

As best shown in FIGS. 9 and 10, toggle mechanism 188 also includes a vertically extending spring 190 fixed to attachment base 130 adjacent its lower end as by rivets 192. As its upper, free end, the spring terminates in a downwardly opening hook or loop 194.

Member 186 of the toggle mechanism has inwardly extending, outer legs 196 and 198 by which the member is pivotally attached to base 130 in the same manner as the various pivotal elements described previously. Integral with the outer legs are two inner legs 200 and 202 connected by a transversely extending leg 204 at their lower and outer end.

The configuration just described produces two generally V-shaped sections 206 and 208 defined by legs 196 and 200 and by legs 198 and 202, the two legs in each section being connected at their distal ends. A fastener 210 inserted through the two V-shaped sections 206 and 208 at these ends fixes the two sections of the member together with the end of one section behind the other (see FIG. 10). The laterally acting spring tension of the two sections and heads 212 on the fastener keep the latter in place.

As shown in FIG. 9, the outer, left-hand leg 196 of member 186 lies under the right-hand leg 174 of the bag-supporting element 162 to its left; and the right-hand leg 198 of the member overlies the left-hand leg 172 of the element 162 to its right. Accordingly, member 186 pivots concomitantly with the bag-supporting elements 162 and the associated pivotal elements 176.

When the bag-supporting elements 162 are rotated upwardly and outwardly to spread the open end of bag 128, element 186 is displaced to the generally vertical position shown in FIG. 10, In this position the lower end portions of inner legs 200 and 202 are confined between spring 190 of the toggle mechanism and the base 130 of the attachment, maintaining pivotal member 186 in the illustrated position. Because of the interconnection between it and the pivotal elements 162 and 176 discussed above, bag-supporting elements 162 are locked in open position with the open end of the bag spread.

When the pivotal elements 162 and 176 are displaced from the open position to the closed position shown in FIG. 7 to close the open end of bag 128 and to collapse it around comestibles 146, the pivotal element 186 of the toggle mechanism moves from the position shown in FIG. 10 to that shown in FIG. 11. As it does so, the transversely extending leg 204 of the member moves upwardly until it bottoms in the loop 194 at the upper end of spring 190; and legs 200 and 202 of the member engage the upper edge 214 of base 130. This precludes further downward movement of element 186, bag-supporting elements 162, and elements 176.

As discussed above, this limiting of the downward movement of bag-supporting elements 162 is important because it permits bag 128 to collapse around the comestibles 146 in a manner which insures uniform and efficient cooking of the comestibles and keeps the cooking medium from flowing into the bag in those applications where liquid is employed.

Also, this keeps the various elements 162, 176, and 186 from pivoting downwardly to the extent that the element attaching loops at their outer ends can become unhooked from attachment base 130 (the loops of the bag-supporting elements 162, which are typical, are shown in FIG. 8 and identified by reference character 216). Accordingly, it is not necessary to close these loops after the pivotable elements are assembled to base 130. Thus, the novel toggle mechanism in question simplifies the assembly of the attachment with a concomitant reduction in its cost.

Figure 12:
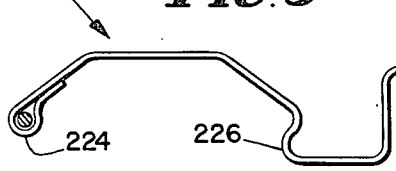
FIG. 12 is a side view of a latch employed in the attachment of FIGS. 6–8.

Attachment 126 also has a latch 222 which differs considerably from those employed in the previously described attachments. As best shown in FIGS. 7 and 12, this latch is of sheet metal construction. At one end it is pivotally mounted on the transverse leg 182 of one of the elements 176, the leg extending through a loop 224 formed at the end of the latch.

Subsequent portions of the latch extend upwardly, horizontally, and downwardly to clear the inner ends of pivotable members 162. These are followed by a hook portion 226 which is engageable with the transverse leg 182 of the element 176 facing that to which the latch is connected to hold the two elements 176 in the illustrated positions. As these two elements are interconnected with the remaining pivotable elements in the manner described previously, the latter are likewise held closed.

At its free end, the latch terminates in a handle portion 228 by which the latch can be released and engaged.

Figure 14:
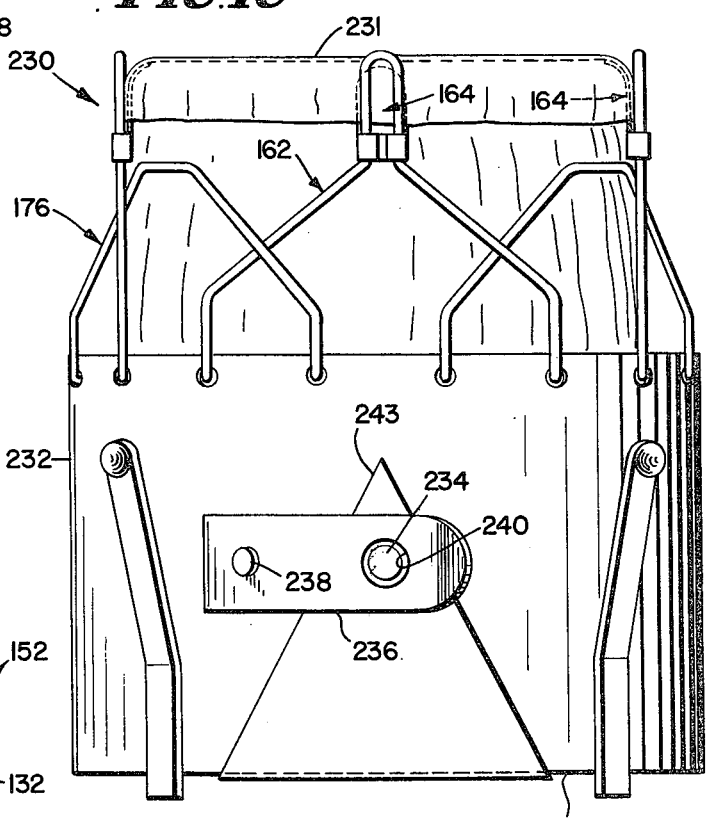
FIG. 14 is a view similar to FIG. 7 of yet another cooking utensil accessory embodying the principles of the present invention.

FIG. 14 shows a cooking utensil attachment 230 which differs from that just described primarily in the mechanism by which the corners of disposable bag 231 are secured to the base 232 of the attachment. In this embodiment of my invention, the mechanism in question includes two cylindrical studs 234 fixed in diametrically opposed relationship to base 232 and a spring retainer 236 associated with each stud. The retainers are pivotally fixed to base 232 by pivot pins 238. With the retainers operatively associated with studs 234, the studs extend through apertures 240 in the free ends of the retainers.

As in the embodiment of my invention described with reference to FIGS. 6-12, the lower end of disposable bag 231 is stretched across the bottom edge 242 of base 232. The corners 243 of the bag are then pulled up over studs 234. Spring retainers 236 are then pulled out, swung into the position shown in FIG. 14, and released, clamping the corners of the bag in place.

Figure 15:
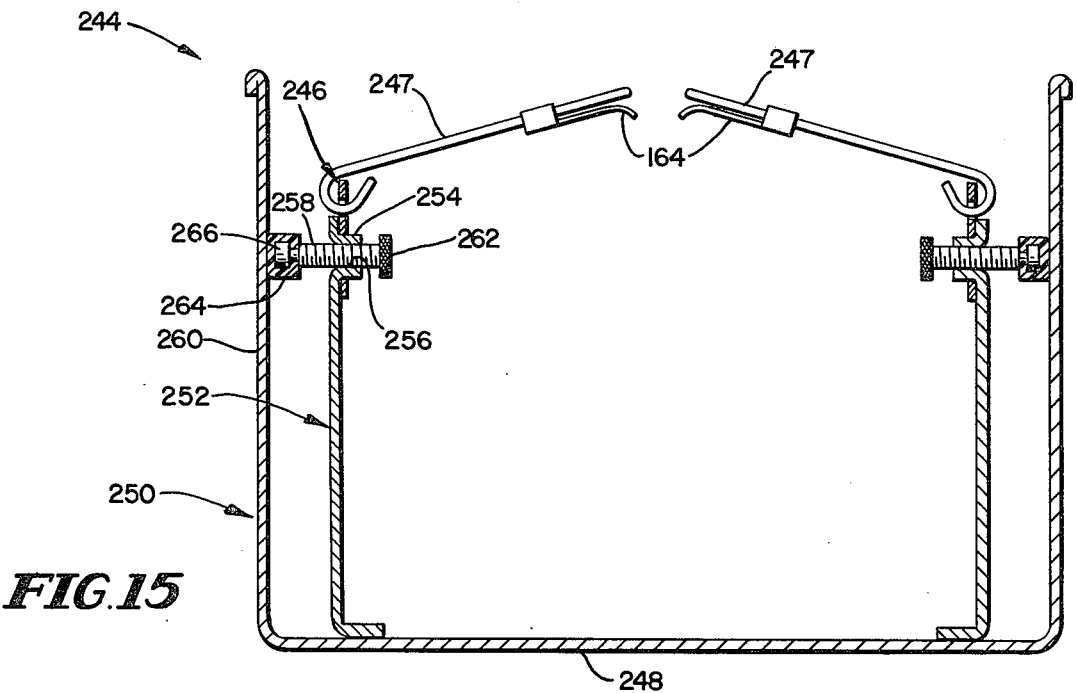
FIGS. 15–17 are views similar to FIG. 1 of three more embodiments of the present invention.

FIG. 15 depicts a cooking utensil attachment 244 in accord with the principles of the present invention. This attachment is similar to that discussed above in conjunction with FIG. 3 to the extent that it has a ring-like base 246 to which inwardly extending, bag-supporting components 247 like those shown in FIGS. 6-8 are attached and in that base 246 is supported from the bottom wall 248 of the vessel 250 with which it is employed on legs 252 fixed to the base at intervals therearound.

Opposite base 246, inwardly directed, internally threaded bosses 254 are formed on legs 252. These bosses extend through apertures 256 in the base to which the legs may be attached in any convenient manner.

Positioning members 258 threaded through bosses 254 and into engagement with the side walls 260 of vessel 250 center the attachment in the vessel. Thumbscrews 262 at the inner end of the threaded members facilitate this manipulation, and tips 264 of a softer material fitted over heads 266 at their outer end keep the members from marring the side wall of the vessel.

Attachment 244 has the advantage that, like the attachment shown in FIGS. 3 and 4, it can be readily adjusted for use with vessels which differ considerably in size.

In those versions of the present invention so far described, the lid of the pan or cooking vessel has not been illustrated because it can be of any usual construction and because it cooperates with the pan or vessel in which the accessory is employed in a conventional manner.

Figures 16, 17:
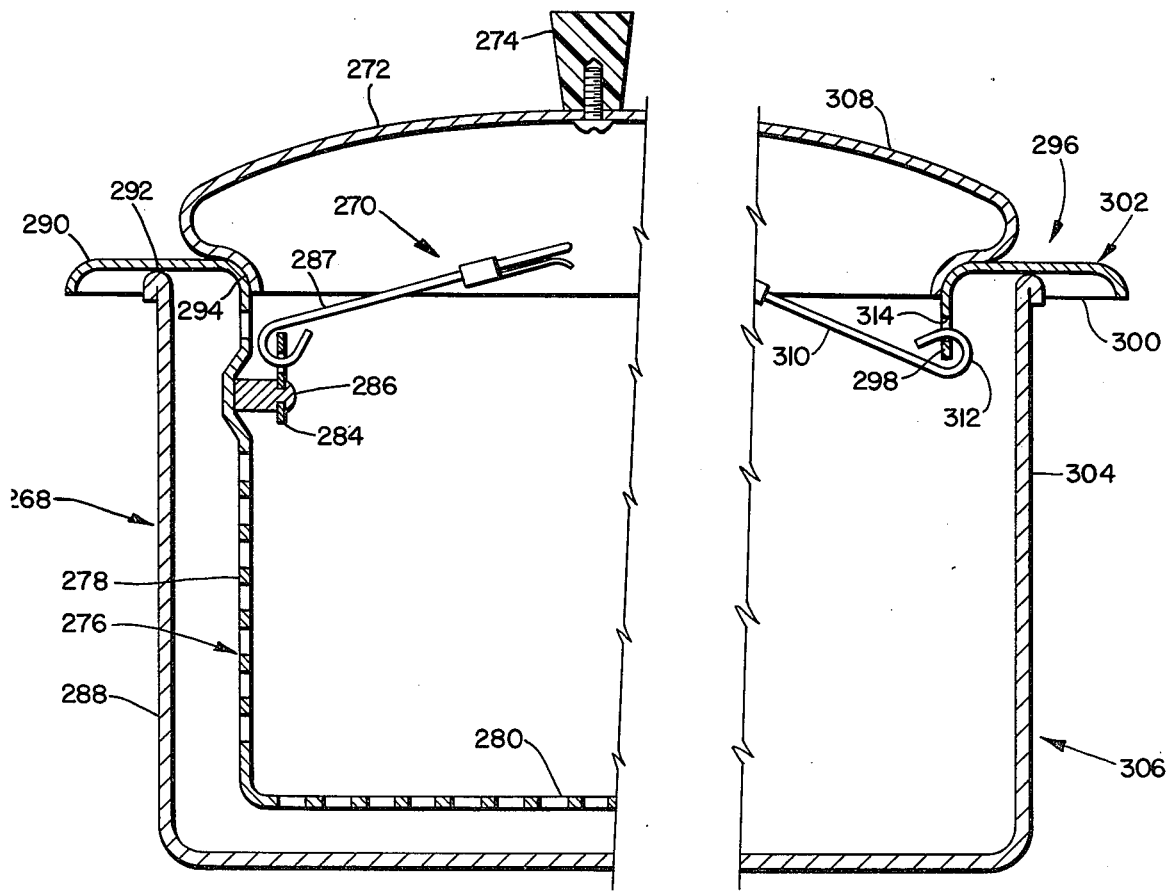

FIG. 16, in contrast, depicts a conventional vessel 268 having associated therewith an attachment 270 which numbers a cover 272 equipped with a handle 274 among its major components.

Attachment 270 also includes a rack 276 with perforate side and bottom walls 278 and 280. A base 284 is fixed to the side wall 278 of the rack by headed support members 286. Bag-supporting elements 287 of the character shown in FIGS. 6-8 are pivotally fixed to base 284 in the manner described previously.

Rack 276 and the components supported from it are, in turn, supported from the side wall 288 of the cooking vessel 268 by an outwardly directed, horizontal flange or rim 290 fashioned at the upper end of the rack side wall structure. This flange rests on the upper edge 292 of the cooking vessel side wall 288. As shown in FIG. 16, this also provides a seal between the vessel and the flange of the attachment.

The isolation of the interior of vessel 268 is completed by cover 272. At its lower edge, the side wall structure 294 of the latter is configured to match the contours of rim 290, providing a seal between the flange and the cover.

FIG. 17 depicts an attachment 296 which differs from that shown in FIG. 16 primarily in that the base 298 of the unit and the supporting flange 300 are integrated into a single component 302. As in the earlier-described embodiment, the flange supports the attachment from the side wall 304 of the cooking utensil 306 with which it is associated.

In addition, to avoid interference with the cover 308 of the attachment, its bag-supporting elements 310 (which may be like any of those described above) are so fixed to the base that they pivot upwardly from beneath the base. As in the other embodiments of the invention described herein, the pivotal connections are made by circular ends 312 of the elements which extend through apertures 314 in and at entervals around the base.

Like the embodiment of the invention shown in FIG. 16, that just described has the virtue of being usable with containers or pans of different sizes.

I have illustrated in the drawing and described above a variety of attachments constructed in accord with the principles of the present invention. These particular embodiments were in part selected to show the features of my invention with a minimum of repetition. Therefore, while it has not in conjunction with each embodiment been so stated, it is to be understood that various ones of these features can be employed in the same attachment and that such attachments are fully intended to be covered by the appended claims. I have also pointed out that attachments adhering to the principles of the present invention will not necessarily resemble those shown in the drawing in appearance to any great extent. Consonant with the foregoing, the present embodiments of my invention are to be considered in all respects as illustrative and not restrictive, the scope of the invention being indicated by the appended claims rather than by the foregoing description; and all changes which come within the meaning and range of equivalents of the claims are therefore to be embraced therein.

What is claimed and desired to be secured by Letters Patent is:

1. An attachment for use with a cooking vessel and a disposable bag to facilitate the cooking of comestibles in said bag, said attachment including a base; means for supporting the base from and fixing it relative to the cooking vessel; and a plurality of inwardly extending elements fixed to said base for concomitant pivotal movement relative thereto, there being bag engageable means at the inner ends of said elements to which the bag can be attached at an opening defining end thereof, whereby said elements can be concomitantly rotated toward each other to constrict the opening during the cooking of the comestibles and away from each other to enlarge the opening and furnish access to the comestibles in the bag.

2. The attachment of claim 1, together with means for latching said elements in at least one of the positions to which they are rotated to thereby keep the opening in the bag configured as desired.

3. The attachment of claim 2, wherein the means for latching the elements in a position to which they are rotated includes cooperating means on two diametrically opposed ones of said inwardly extending elements.

4. An attachment for use with a cooking vessel for comestibles, said attachment being disposable in said vessel and including a base; means for supporting the base in the cooking vessel with which the attachment is associated; and means supported by said base for keeping the comestibles being cooked or a comestibles-filled bag submersed in a cooking liquid in said vessel, said bag having an open end and the means for keeping the comestibles or the comestibles-filled bag and its contents submersed including means for gathering the portion of the bag in which the opening is formed and keeping said portion uppermost during the cooking cycle so that gases and vapors can escape through the opening without the cooking medium entering the bag therethrough.

5. An attachment according to claim 4, wherein the means for keeping the comestibles or comestibles-filled bag submersed includes a plurality of inwardly extending elements fixed to said base at intervals therearound for concomitant pivotal movement relative to the base between positions in which said elements are generally horizontally disposed and bar the upward movement of the comestibles or bag therepast and positions in which the inner ends of the elements are swung upwardly and outwardly, thereby affording access to the comestibles or to the interior of the bag.

6. The attachment of claim 5, wherein each of said inwardly extending elements has two leg portions each pivotally fixed relative to the base and one of the leg portions of each of the elements lies over the closest leg portion of the adjacent element and the other leg portion thereof lies under the nearest leg portion of the element thereadjacent, whereby rotation of one of said elements will effect the concomitant rotation of all of said elements.

7. The attachment of claim 6, wherein two facing ones of said inwardly extending elements each have a transversely extending leg between two leg portions as aforesaid, said attachment further including a latch for locking the elements in the positions in which they bar movement of the comestibles or bag upwardly therepast and said latch being pivotably mounted on the transverse leg of one of said two inwardly extending elements and having a portion thereof which can be fixed into engagement with the transverse leg of the facing, inwardly extending element to lock said elements together and thereby hold in position those elements and the elements which are concomitantly pivotable therewith.

8. The attachment of claim 5, together with retainer means for keeping the inner ends of said elements from passing below a selected position when they are rotated toward each other to the positions in which they are capable of keeping the comestibles or bag from moving upwardly therepast and for maintaining said elements in a second position in which the inner ends thereof are elevated and spread apart to afford access to the comestibles or bag interior, said retainer means comprising a vertically extending spring fixed to said base and free to flex away from said base at the upper end thereof and a member concomitantly pivotal with said inwardly extending elements and having portions thereof slidable between said spring and said base from first positions in which they are clamped between said base and said spring to keep the inwardly extending elements in the positions in which they are swung upwardly and outwardly to furnish access to the comestibles or bag and positions in which the downward movement of the pivotal member is precluded by said spring and said base to keep the inner ends of the concomitantly pivotal, inwardly extending elements from moving downwardly past said selected positions thereof.

9. The attachment of claim 4, wherein the means for supporting the attachment in the cooking vessel comprises spring clip means fixed to said base at intervals therearound.

10. The attachment of claim 4, wherein the means for supporting the base in the cooking vessel comprises legs fixed to said base at intervals therearound.

11. The attachment of claim 4, together with means for spacing the attachment base relative to the side walls of the vessel with which it is associated.

12. The attachment of claim 11, wherein said spacing means is adjustable, thereby giving said attachment the capability of being used with vessels of different sizes.

13. The attachment of claim 12, wherein the attachment base has a vertically extending wall means and wherein said spacing means comprises internally threaded members rigid with said wall means and located at intervals therearound and members threaded therethrough and engageable with the wall of the vessel with which the attachment is associated.

14. The attachment of claim 12, wherein said spacing means comprises means for locking the means by which the base is supported from the vessel in a selected relationship inwardly or outwardly of the base.

15. The attachment of claim 4, wherein the means for supporting the base in the vessel with which the attachment is associated comprises a rim around said base at the upper end thereof.

16. The attachment of claim 15, wherein said attachment includes a cover engageable with said base and co-operable with said rim to isolate the interior of the vessel with which the attachment is associated from the surrounding environment.

17. An attachment for use with a cooking vessel and an open ended, disposable cooking bag to facilitate the cooking of comestibles in the bag, said attachment including a base; means attached to said base for supporting said bag in said cooking vessel with the open end thereof uppermost, said last-mentioned means being selectively operable to spread the portion of the bag in which the opening is formed and thereby furnish access to the contents of said bag; and means for supporting the base from the cooking vessel.

18. The attachment of claim 17, wherein the means for supporting the disposable bag from the cooking vessel comprises a plurality of inwardly extending elements fixed to said base for concomitant pivotal movement relative thereto, there being bag engageable means at the inner ends of at least a part of said elements to which the bag can be attached at the opening defining end thereof, whereby said elements can be concomitantly rotated toward each other to constrict the opening and away from each other to enlarge it.

19. The attachment of claim 18, wherein said bag engageable means are spring clips at the inner ends of the inwardly extending elements.

20. The attachment of claim 19, wherein said spring clips have a flexible clamp portion and attaching portions fixing the clips to the inner ends of the elements with the clamp portions thereof abutting said elements.

21. The attachment of claim 18, wherein the means for supporting the base from the cooking vessel is a flange surrounding said base.

22. The attachment of claim 21, together with a cover configured to fit said flange and co-operable therewith to isolate the interior of the vessel from the ambient surroundings.

23. The attachment of claim 22, wherein the bag-supporting elements are so fixed to the base as to pivot upwardly from beneath said base.

24. The attachment of claim 17, together with means to which the lower corners of the disposable cooking bag can be attached to shape said lower end into a configuration which facilitates the removal of comestibles from said lower bag end and to keep said lower bag end from floating upwardly in applications where the bag is surrounded by a liquid cooking medium.

25. The attachment of claim 24, wherein said base has a vertically extending side wall means and wherein the means by which the cooking bag can be attached to said base comprises studs protruding from the exterior of said side wall means at diametrically opposed locations therearound.

26. The attachment of claim 25, wherein the means by which the cooking bag can be attached to said base also includes pivotally mounted spring members which are engageable over said studs to clamp the corners of the bag in place.

27. The attachment of claim 17, together with means for spacing said base from the side walls of the cooking vessel and means for fixing said spacing means to said base and permitting adjustment of said means relative to the base so that said attachment can be adjusted to fit cooking vessels of different sizes.

28. The attachment of claim 27, wherein the means for spacing said base from the cooking vessel side walls comprises spring clips at the outer end thereof for mechanically fixing the attachment to the vessel.

29. The attachment of claim 27, wherein said attachment spacing means have elongated, longitudinally extending slots therein and fasteners extending through the slots and threaded into the base for clamping the spacing means against the base in selectively adjustable positions relative to said base.

30. The attachment of claim 27, wherein the means for supporting the base from the cooking vessel comprises legs fixed to said base at intervals therearound and wherein the spacing means are threaded through said legs so that the ends of said spacing means can be moved toward and away from said bases by rotating them.

31. An attachment for use with a cooking vessel and a disposable bag to facilitate the cooking of comestibles in said bag, said bag having an open end and said attachment comprising a base; means for supporting the base in the cooking vessel with which it is associated; a plurality of inwardly extending elements, at least part of said elements having bag engageable means at their inner ends to which those portions of the bag at the open end thereof can be attached and said elements being fixed to said base at their outer ends for concomitant pivotal movement between positions in which the inner ends of said elements are elevated and spread apart to furnish access to the interior of the bag and positions in which the inner ends are rotated toward each other to allow the bag to collapse against its contents and to narrow the opening in said bag; and a latch pivotally fixed to a first one of the inwardly extending, pivotable elements and engageable with a second one of said elements to retain said elements in said second position thereof.

32. The attachment of claim 31, wherein said first and second inwardly extending pivotable elements each have two legs connected by a transverse leg, wherein said latch is pivotable on the transverse leg of said first inwardly extending element, and wherein said latch has a portion thereof which can be flexed into engagement with the transverse leg of said second, inwardly extending element to secure the two pivotable elements together.

33. The attachment of claim 32, wherein said latch has a handle for facilitating its engagement and disengagement from said second, inwardly extending, pivotable element.

34. An attachment for use with a cooking vessel and a disposable bag to facilitate the cooking of comestibles in said bag, said bag having an open end and said attachment comprising a base; means for supporting the base in the cooking vessel with which it is associated; and a plurality of inwardly extending elements fixed to said base for concomitant pivotal movement relative thereto, there being bag engageable means at the inner ends of at least part of said elements to which those portions of the bag at the open end thereof can be attached, and said utensil further including retainer means for keeping the inner ends of said elements from passing below a selected position when they are rotated toward each other to allow the bag to collapse against the comestibles being cooked and to positively maintain said elements in a second position in which the inner ends thereof are elevated and spread apart to afford access to the interior of the bag.

35. The attachment of claim 34, wherein said retainer means comprises a spring fixed to said base and free to flex away from said base at the upper end thereof and a member concomitantly pivotal with said inwardly extending elements and having portions thereof slidable between said spring and said base from first positions in which they are clamped between said base and said vertically extending member to keep the pivotal member in a vertical position and the elements pivotal therewith in said second position and a position in which the downward movement of the pivotal member is precluded by said spring and said base to keep the inner ends of the concomitantly pivotal members from moving downwardly past said first position thereof.

36. The attachment of claim 35, wherein there is a hook portion at the upper end of said spring and wherein the pivotable member has a first portion engageable by said hook portion and a second portion engageable with an upwardly facing portion of the attachment base to limit the downward movement of said pivotable member.

37. An attachment for use with a cooking vessel and a disposable bag to facilitate the cooking of comestibles in said bag, said bag having an open end and said attachment comprising a base; means for supporting the base in the cooking vessel; a plurality of inwardly extending elements with bag engageable elements at their inner ends to which those portions of the bag at the open end thereof can be attached, said elements being pivotally fixed to said base at their outer ends; and elements pivotally fixed to said base and connecting those elements with the bag engageable means together for concomitant pivotal movement between positions in which the inner ends of the last-mentioned elements are elevated and spread apart to open and furnish access to the interior of the bag and positions in which the inner ends of the aforesaid elements are rotated toward each other to allow the bag to collapse against its contents and to narrow the opening in said bag.

* * * * *

UNITED STATES PATENT AND TRADEMARK OFFICE
CERTIFICATE OF CORRECTION

PATENT NO. : 4,005,645
DATED : February 1, 1977
INVENTOR(S) : Alexander Patton Janssen It is certified that error appears in the above-identified patent and that said Letters Patent are hereby corrected as shown below:

Column 2, line 7, change "guickness" to --quickness--.

Column 3, line 18, cancel "Enssle".

Column 5, line 27, change "right-hend" to --right-hand--.

Column 5, line 66, change "guality" to --quality--.

Column 6, line 51, change "vessel" to --rack--.

Column 7, line 27, change "135" to --136--.

Column 7, line 33 add --is-- after "This".

Column 8, line 65, after "FIG. 10," change the "comma" to --period--.

Column 14, line 38, change "bases" to --base--.

Signed and Sealed this

Eleventh Day of October 1977

[SEAL]

Attest:

RUTH C. MASON
*Attesting Officer*

LUTRELLE F. PARKER
*Acting Commissioner of Patents and Trademarks*